United States Patent [19]

Renfroe et al.

[11] Patent Number: 5,659,295

[45] Date of Patent: Aug. 19, 1997

[54] SLIDING PISTON PRESSURE SENSING DEVICE

[75] Inventors: Donald Renfroe; Steven L. Ludeke; James Rose, all of Knoxville; David A. Bilbrey, Crossville, all of Tenn.

[73] Assignee: Bendix-Atlantic Inflator Company, Knoxville, Tenn.

[21] Appl. No.: 568,883

[22] Filed: Dec. 11, 1995

[51] Int. Cl.$^6$ ..................................... G08B 21/00
[52] U.S. Cl. ..................... 340/626; 340/611; 280/737; 73/37
[58] Field of Search ..................... 340/611, 626; 280/735, 737, 741; 116/266; 73/37, 49.3; 222/5, 23

[56] References Cited

U.S. PATENT DOCUMENTS

| | | | |
|---|---|---|---|
| 4,669,960 | 6/1987 | Allen et al. | 340/626 |
| 5,076,607 | 12/1991 | Woods et al. | 280/737 |
| 5,140,113 | 8/1992 | Machado | 340/626 |
| 5,257,819 | 11/1993 | Frantom et al. | 280/737 |
| 5,313,194 | 5/1994 | Varos | 340/626 |
| 5,404,746 | 4/1995 | Ocker | 73/37 |
| 5,496,062 | 3/1996 | Rink et al. | 280/737 |

*Primary Examiner*—Brent A. Swarthout
*Assistant Examiner*—Van T. Trieu
*Attorney, Agent, or Firm*—Markell Seitzman

[57] ABSTRACT

A pressure indicating device (30) for providing an indication of the pressure that existed within a fluid filled pressure vessel (22) just prior to depressurization of the pressure vessel. The device comprises: a housing (102); a piston (130) for temporarily sealing an open end of the housing and outwardly movable in response to a pressure differential not less than a predetermined level generated subsequent to the depressurization of the pressure vessel; and a sheer disk (150) including a first part (160) attached to an end of the piston and a second part (162) attached to an end of the housing (102). The piston and the housing cooperate to define a pressure storage cavity (170) bounded by the piston and housing, the sheer disk (150) including a valve (164) for permitting the fluid within the pressure vessel to enter the pressure cavity and stabilize at a level substantially equal to the pressure level within the pressure vessel and for inhibiting a rapid decrease in the pressure within the pressure cavity immediately subsequent to depressurization of the pressure vessel.

9 Claims, 3 Drawing Sheets 5,659,295

SLIDING PISTON PRESSURE SENSING DEVICE

BACKGROUND AND SUMMARY OF THE INVENTION

The present invention relates to a device that provides an indication of the pressure that existed within a pressure vessel just prior to its being opened or depressurized. More particularly, the present invention is useful in occupant safety restraint systems employing pressure vessels such as those used in a hybrid inflator.

Hybrid inflators typically include a pressure vessel having a quantity of stored gas under pressure. If the stored gas has leaked out of the pressure vessel there may not be a sufficient quantity of gas therein to adequately inflate an air bag. Some hybrid inflators include a low pressure switch or sensor to generate a warning signal to the driver, in the event that its internal pressure has dropped as a result of losing some quantity of gas. Pressure switches include wires which extend through openings in the pressure vessel. These openings are appropriately sealed using a glass-to-metal seal of known variety. As can be appreciated these wires, openings and seal may create a potential leak path if they are not correctly sealed. The pressure switch signal, via electronic circuitry provides an indication to the vehicle occupant that the inflator may not be in an operative condition and that repair or replacement may be needed. History and experience have shown that the use of a low pressure switch is unnecessary. If the pressure switch or sensor is eliminated it might still be desirable to provide an indication that the pressure vessel, i.e. the hybrid inflator, was properly pressurized prior to an accident, that is, it contained a sufficient amount of pressurized gas to inflate an air bag.

It is the object of the present invention to provide a device for use within a hybrid inflator that will provide a post depressurization, or "tell tale", indication of inflator function. An additional object of the present invention is to provide a hybrid inflator having a higher degree of reliability against leakage than one that includes a pressure switch.

Accordingly, the invention comprises: a pressure indicating device for providing an indication of the pressure that existed within a fluid filled pressure vessel just prior to depressurization of the pressure vessel. The device comprises: a housing; piston means for temporarily sealing an open end of the housing and outwardly movable in response to a pressure differential not less than a predetermined level generated subsequent to the depressurization of the pressure vessel; and a sheer disk including a first part attached to an end of the piston means and a second part attached to an end of the housing. The piston means and the housing cooperate to define a pressure storage cavity bounded by the piston and housing, the sheer disk including valve means for permitting the fluid within the pressure vessel to enter the pressure cavity and stabilize at a level substantially equal to the pressure level within the pressure vessel and for inhibiting a rapid decrease in the pressure within the pressure cavity immediately subsequent to depressurization of the pressure vessel.

Many other objects and purposes of the invention will be clear from the following detailed description of the drawings.

DETAILED DESCRIPTION OF THE DRAWINGS

Figure 1:
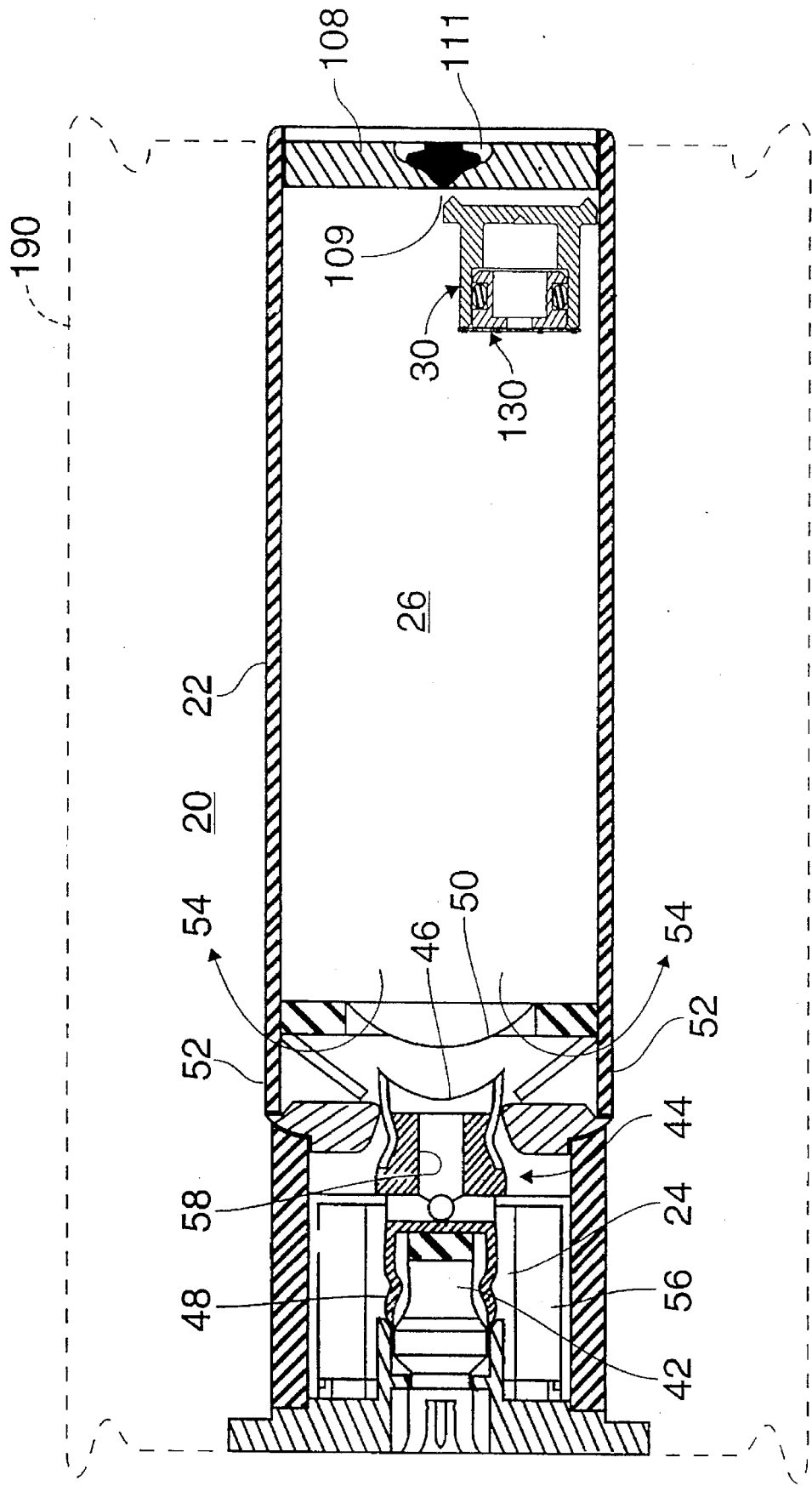
FIG. 1 illustrates a cross-sectional view of a hybrid inflator showing the installation of the present invention.

Reference is made to FIG. 1 which illustrates an illustrative hybrid inflator 20 comprising a pressure vessel 22, an activation portion 24 and a post inflation indicating device generally shown as 30. The present invention is usable with all types of hybrid or stored gas inflators such as those used on the passenger side, driver side, for protection in side impact accidents, etc. while the preferred embodiment of the invention shows the device 30 inside the inflator 20, it should be appreciated that it could be mounted external thereto. U.S. Pat. No. 5,076,607 is illustrative of hybrid inflators and is incorporated herein by reference. The activation portion comprises a pyrotechnic squib 42 positioned remote from a frangible disk 50. Inflators such as 20 also include a means for breaking the disk 50. The specific means is not pertinent to this invention. This is accomplished in inflator 20 by a sliding piston 44. This piston is positioned about the squib 42 and has a cutting surface 46 at one end. The other end 48 of the piston 44 is frictionally engaged to the squib 42. As is known in the art upon receipt of a control signal, the squib begins to burn, the products of combustion urge the piston 44 outwardly (to the right, as shown in FIG. 1) to break a frangible disk 50 which encloses an end of the pressure vessel 22. The pressurized gas 26 (typically Argon) stored within the pressure vessel 22 thereafter flows across the broken disk and out through the exit orifice(s) or ports 52. The gas flow is generally shown by arrows 54. As the squib burns it ignites a closely positioned quantity of propellant 56, such as Arcite, made by Atlantic Research Corporation. The products of combustion of the burning propellant flow through one or more passages 58 in the piston 44 and mix with the pressurized gas to heat the remaining inflation (pressurized) gas 26 prior to its exiting (through orifices or ports 52) to fill a closely positioned air bag.

Figure 3:
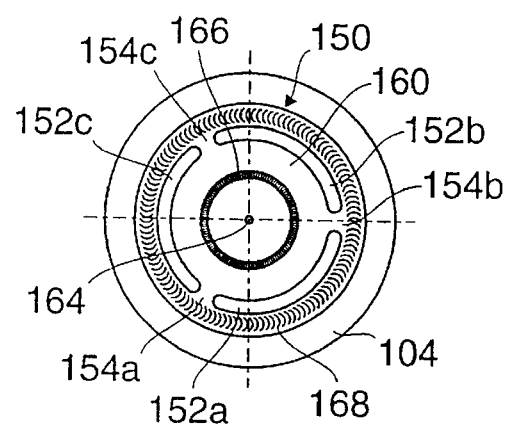
FIG. 3 is an end plan view of the invention.
Figure 2:
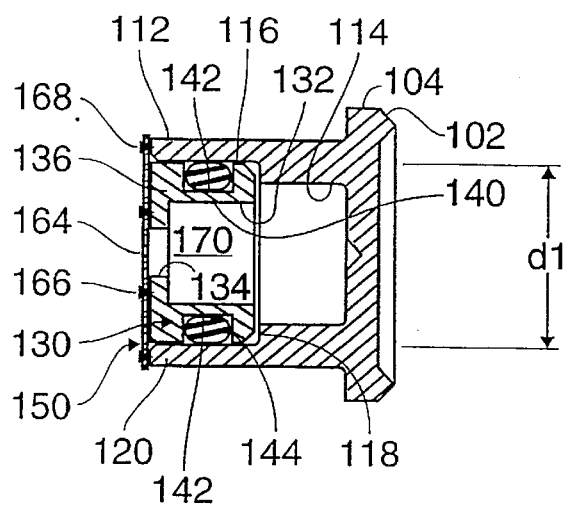
FIG. 2 is a cross-sectional view of the invention.
Figure 5:
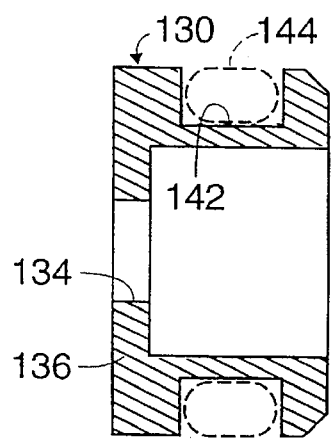
FIGS. 4 and 5 are respective isolated views of a housing member and piston.
Figure 4:
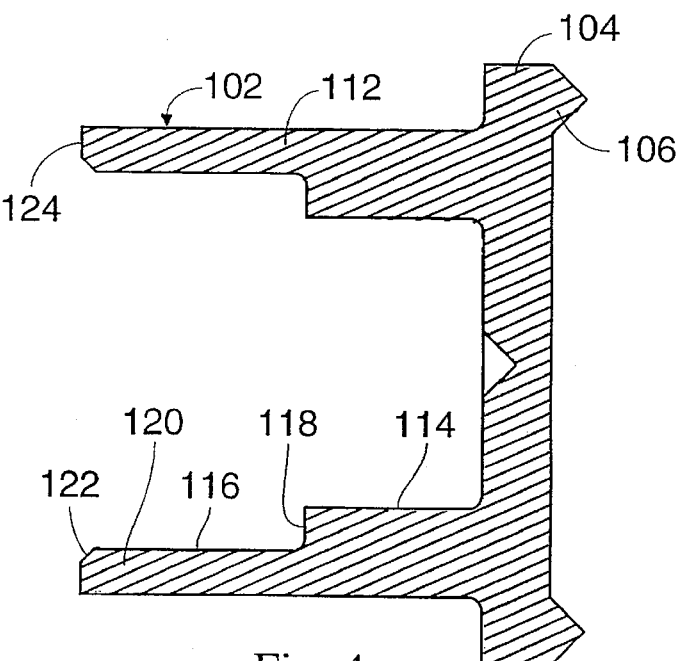

Reference is made to FIGS. 2 and 3 that show an enlarged view of the device 30. The device 30 includes a cup shaped housing 102 having at one end 104 an annular boss 106 to facilitate the welding of the device to the end cap 108 of the pressure vessel. The end cap 108 includes a fill port 109 sealed with closure 111. The housing 102 additionally includes a cylindrical wall 112 having a stepped inner bore defining a first bore 114 and a larger diameter second bore 116 defining a step or shoulder 118 therebetween. The end 120 of the wall 112 includes a chamfer 122 and a flat face portion 124.

Situated within the larger diameter bore 116 is a slidable piston 130. The piston also includes a large diameter bore 132 and a small diameter bore 134 extending through an end wall 136. The piston also includes a side wall 140 having a groove 142 formed therein. Positioned within the groove is an O-ring 144 that provides a fluid seal against the housing 102. Secured to the end face 124 of the housing 102 and to the wall 136 of the piston is a sheer disk generally shown as 150. In the preferred embodiment of the invention the sheer disk is formed of an Inconel alloy comprising approximately 7 percent iron, 77 percent nickel and 16 percent chrome. The sheer disk includes a plurality of slotted, curved openings or slots 152a–c situated at a constant radius defining a plurality of webs 154 a, b and c therebetween. The slots 152a–c separate an inner portion 160 of the disk from its outer portion 162. The disk additionally includes a very small hole 164 (shown enlarged) and typically 0.05mm located at or near its center. The sheer disk 150 is first welded or otherwise attached to the piston 130 such that the center of the disk 160 and the piston are preferably coaxial. A weld line 166 is illustrative of such an attachment. Thereafter the piston 130 and the O-ring 144 are fitted within the housing 102 with the outer portion 162 of the sheer disk 150 seated upon the end face 124 of the wall 112. With the sheer disk 150 in place it is circumferentially welded to the face 124, such weld being illustrated by numeral 168. As will be appreciated by the discussion below, the performance of this pressure sensing device 30 will vary with the mechanical characteristics and composition of the disk. As an example, the performance will change by increasing the thickness of the disk, the number of slots and/or the width of the various webs.

In normal operation the pressure vessel 22 of the inflator 20 is filled with pressurized inflation gas, typically 98% Argon and 2% Helium to a pressure of about 2500 psi (172 Bar). While not a part of the present invention the Helium is sensed by a leak detector to check the initial integrity of any welds in the pressure vessel. The pressurized inflation gas, in the pressure vessel 22, envelopes the device 30 and presses upon sheer disk 150. When the pressure vessel 22 is initially filled there is no inflation gas within the pressure cavity 170 of the device 30, that is, that portion of the device internal to the piston 130 and housing 102, as fluid (gas) flow is inhibited by the small orifice 164. During this time a pressure force F acts across the piston equal to:

$$F = P \times Area = (P \times d1^2 \times \pi)/4,$$

where P is the internal pressure within the pressure vessel and d1 is the diameter across the width of the piston 130.

Over time, pressurized inflation gas enters or leaves the cavity 170 through orifice 164, and the pressure in the cavity 170 equalizes at the internal pressure level of the pressure vessel 122.

When the inflator is activated the pressure vessel is depressurized via the release of the pressurized gas, when the frangible disk 50 is opened. An air bag 190, mounted nearby, is rapidly inflated, typically within about 40–60 milliseconds. As the pressurized inflation gas leaves the pressure vessel, the internal pressure P rapidly approaches zero. Fluid flow into and out of the device 30, i.e. cavity 170, is inhibited by the orifice 164, as such, even though the pressure in the pressure vessel rapidly reduces, the pressure Pc, within the cavity 170 of the device 30 cannot change rapidly. The pressure within the device (cavity) remains substantially at the value of the pressure, inside the pressure vessel just prior to depressurization. After depressurization a significant outwardly pushing pressure differential acts on the piston causing the sheer disk 150 to break at its webs 154a–c if the pressure differential is above a determinable value.

Figure 6:
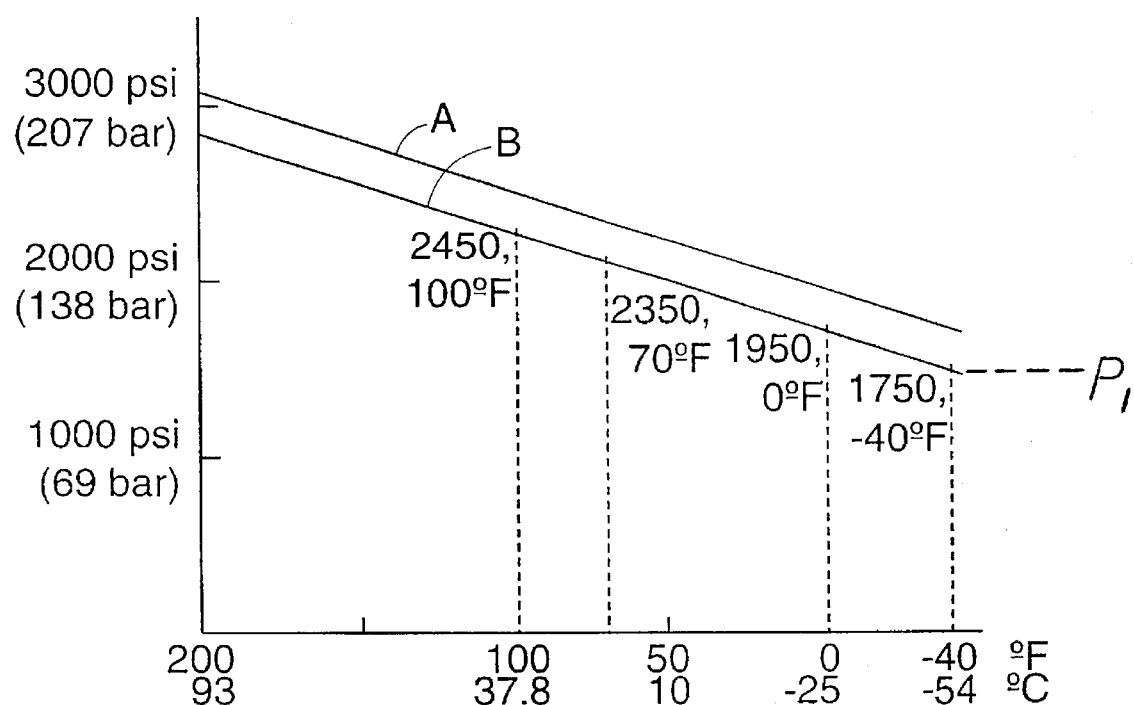
FIG. 6 shows pressure-temperature curves.

Reference is briefly made to FIG. 6 which shows a family of curves. Each curve shows the approximate relationship between the pressure within a pressure vessel and temperature for an inflator having a given mass or weight of inflation gas. As an example, curve A shows the pressure-temperature relationship for an inflator that has not lost any inflation gas. Curve B shows the pressure-temperature relationship for an inflator that has lost a determinable amount of gas by weight or mass. An inflator that has lost some of its inflation capability will not cause an air bag to inflate as fully as an air bag that is completely full. However, it should be appreciated that even though a significant amount of gas is lost, the air bag is still able to adequately protect an occupant, since the desired speed of inflation and fullness of inflation of the air bag will depend amongst other things on the severity of a crash, the energy absorbing ability of the vehicle, the degree to which the occupant is retained by a seat belt, and the position of the occupant relative to the air bag. Superimposed upon these curves is a pressure level P1. This pressure level is indicative of a low level limit value of inflation pressure at a given temperature (1750 psi,–40°F. or 121 Bar, –30°C.). Consequently, if the inflator is designed to properly operate if the internal pressure is above this level, the device 30 must be able to provide some post depressurization indication of the internal pressure. Implicitly this pressure level P1 also indicates the minimum pressure differential force (Pc×Area) that would be exerted on the piston 130 and hence on the webs 154a–c just after depressurization under these pressure/temperature conditions. It should be recalled that the pressure or force acting on the piston 130 rapidly falls to essentially zero and the force acting thereon is equal to Pc times the area (of the piston).

With the pressure vessel 22 depressurized, a force will be exerted on the piston 130 tending to push the piston 130 out of and away from the housing 102. This force will also be exerted on the webs 154a–c of the sheer disk 150. If the tensile strength of the webs 154 is chosen to be at a level equal to the applied force (at pressure level P1), the webs 154 will break, thereby permitting the piston 130 to move outwardly relative to the housing.

If for some reason the pressure vessel lost a very significant amount of inflation gas its internal pressure as well as the pressure in cavity 170 would be less than P1. Subsequent to depressurization, a pressure/force will be exerted on piston 130, as described above, tending to move the piston outwardly. However, since the force is below the tensile strength of the webs 154, they will not break and the piston will remain retained within the housing 102.

At some time subsequent to depressurization of the pressure vessel it might be necessary to inspect the hybrid inflator. As mentioned above, if the pressure within the pressure vessel was at or above its minimum design pressure level P1, the webs 154 will break and the piston 130 is no longer permanently fixed to its housing 102. Such inspection may be as simple as grasping the inflator and shaking it. If upon shaking, a clanging noise is heard, such noise is indicative of the fact that the pressure vessel contained a sufficient quantity of pressurized gas, just prior to its depressurization, as the noise can only be produced by a loose and dislodged piston 130, which can only be dislodged if the internal pressure within the pressure vessel, just prior to its depressurization was above the pressure level P1.

Many changes and modifications in the above described embodiment of the invention can, of course, be carried out without departing from the scope thereof. Accordingly, that scope is intended to be limited only by the scope of the appended claims.

We claim:

1. A device (30) for providing an indication of the pressure that existed within a fluid filled pressure vessel (22) just prior to depressurization of the pressure vessel, comprising:

a housing (102);

piston means (130) for temporarily sealing an open end of the housing and outwardly movable in response to a pressure differential not less than a predetermined level generated subsequent to the depressurization of the pressure vessel;

a shear disk (150) including a first part (160) attached to an end of the piston means and a second part (162) attached to an end of the housing (102), the piston means, shear disk and the housing cooperating to define a pressure storage cavity (170) bounded by the piston, shear disk and housing, the shear disk (150) including valve means (164) for permitting the fluid within the pressure vessel to enter the pressure cavity and stabilize at a level substantially equal to the pressure level within the pressure vessel and for inhibiting a rapid decrease in the pressure within the pressure cavity immediately subsequent to depressurization of the pressure vessel.

2. The device as defined in claim 1 wherein the device is located within the pressure vessel.

3. The device as defined in claim 1 wherein the shear disk includes a plurality of webs (154) interconnecting its first and second parts and breakable in response to a force applied to the piston means, such force corresponding to the predetermined level, the breaking of the webs permitting the piston means to be moved outwardly relative to the housing in response to the force corresponding to the pressure differential acting thereon.

4. The device as defined in claim 3 wherein the piston means includes seal means (144) for providing a fluid seal relative to the housing.

5. A device (30) for providing an indication of the pressure that existed within a fluid filled pressure vessel (22) just prior to depressurization of the pressure vessel, comprising:

a housing (102);

piston means (130), including a body (136,140), having a bore (132,134) closed at one end by a shear disk (150), for temporarily sealing, an open end of the housing, the piston means being outwardly movable in response to a pressure differential not less than a predetermined level generated subsequent to the depressurization of the pressure vessel;

the shear disk (150) including a first part (160) attached to an end of the piston body and a second part (162) attached to an end of the housing (102), the piston means, shear disk and the housing cooperating to define a pressure storage cavity (170) bounded by the piston and housing, one of the sheer disk (150) and piston means including valve means (164) for permitting the fluid within the pressure vessel to enter the pressure cavity and stabilize at a level substantially equal to the pressure level within the pressure vessel and for inhibiting a rapid decrease in the pressure within the pressure cavity immediately subsequent to depressurization of the pressure vessel.

6. The device as defined in claim 5 wherein the valve means includes a small orifice (164).

7. The device as defined in claim 6 wherein the device is located within the pressure vessel.

8. The device as defined in claim 6 wherein the shear disk includes a plurality of webs (154) interconnecting its first and second parts and breakable in response to a force applied to the piston means, such force corresponding to the predetermined level, the breaking of the webs permitting the piston means to be moved outwardly relative to the housing in response to the force corresponding to the pressure differential acting thereon.

9. The device as defined in claim 8 wherein the piston means includes seal means (144) for providing a fluid seal relative to the housing.

* * * * *